United States Patent [19]
Lee et al.

[11] Patent Number: 6,055,577
[45] Date of Patent: Apr. 25, 2000

[54] SYSTEM FOR GRANTING BANDWIDTH FOR REAL TIME PROCESSES AND ASSIGNING BANDWIDTH FOR NON-REAL TIME PROCESSES WHILE BEING FORCED TO PERIODICALLY RE-ARBITRATE FOR NEW ASSIGNED BANDWIDTH

[75] Inventors: Sue Lee, San Mateo; William Bailey, Palo Alto, both of Calif.

[73] Assignee: Oracle Corporation, Redwood Shores, Calif.

[21] Appl. No.: 08/646,685

[22] Filed: May 6, 1996

[51] Int. Cl.⁷ ........................................... G08F 13/14
[52] U.S. Cl. ..................... 709/233; 710/107; 710/110; 710/113; 710/29
[58] Field of Search .................. 395/200.62, 200.63, 395/200.64, 821, 825, 827, 842, 843, 844, 845, 846, 847, 848, 856, 200.68, 849, 880; 709/233; 710/107, 110, 113, 29, 60

[56] References Cited

U.S. PATENT DOCUMENTS

| | | | |
|---|---|---|---|
| 3,771,143 | 11/1973 | Taylor | 340/172.5 |
| 4,459,588 | 7/1984 | Grow | 340/820.05 |
| 4,761,785 | 8/1988 | Clark et al. | 371/51 |
| 4,959,774 | 9/1990 | Davis | 364/200 |
| 5,088,081 | 2/1992 | Farr | 369/54 |
| 5,124,987 | 6/1992 | Milligan et al. | 371/10.1 |
| 5,208,813 | 5/1993 | Stallmo | 371/10.1 |
| 5,233,618 | 8/1993 | Glider et al. | 371/68.1 |
| 5,235,601 | 8/1993 | Stallmo et al. | 371/40.1 |
| 5,239,659 | 8/1993 | Rudeseal et al. | 395/800 |
| 5,258,984 | 11/1993 | Menon et al. | 371/10.1 |

(List continued on next page.)

OTHER PUBLICATIONS

Microsoft Press, "Computer Dictionary," Second Edition, pp. 124, 165, 1994.

Chen et al., RAID: High–Performance Reliable Secondary Storage, ACM Computing Surveys, Jun. 1994, at 145.

Dervent Research Disclosure RD345097, 1993.

IEEE Transactions On Computers, Dec. 1989, Reddy et al., "An Evaluation of Multiple–Disk I/O Systems," at 1680.

1991 Parallel and Distributed Informatiom Systems International Conference, Hsiao et al., "A Performance Study of Three High Availability Data Replication Strategies," at 18.

Information Week, May 30, 1994, Soat, "Driving Microsoft," at 100.

(List continued on next page.)

*Primary Examiner*—Thomas C. Lee
*Assistant Examiner*—Abdelmoniem Elamin
*Attorney, Agent, or Firm*—Blakely, Sokoloff, Taylor & Zafman LLP

[57] ABSTRACT

A method and apparatus for coordinating access to a storage system in a real time processing system is disclosed. In an apparatus including a file server, a storage system, a real time process, and a non-real time process, an apparatus and method is disclosed for coordinating accesses to the storage system, the method includes the steps of: 1) computing an available data rate from a peak bandwidth data transfer rate for the storage system, 2) receiving a first access request from the real time process, the first access request including a request for a requested data rate, 3) granting the first access request if the requested data rate is less than or equal to the available data rate, and 4) allowing the real time process to directly access the storage system at the requested data rate. In addition, the method of the present invention includes the steps of: 1) receiving a second access request from the non-real time process, the second access request including information indicating an identity of a desired file, 2) assigning an assigned data rate to the non-real-time process, the assigned data rate being less than or equal to the available data rate, and 3) allowing the non-real time process to directly access the storage system at the assigned data rate.

21 Claims, 6 Drawing Sheets

U.S. PATENT DOCUMENTS

| | | | |
|---|---|---|---|
| 5,271,012 | 12/1993 | Blaum et al. | 371/101 |
| 5,278,838 | 1/1994 | Ng et al. | 371/10.1 |
| 5,287,462 | 2/1994 | Jibbe et al. | 395/275 |
| 5,301,287 | 4/1994 | Herell et al. | 395/400 |
| 5,303,244 | 4/1994 | Watson | 371/10.1 |
| 5,305,326 | 4/1994 | Solomon et al. | 371/11.1 |
| 5,315,602 | 5/1994 | Noya et al. | 371/40.4 |
| 5,333,305 | 7/1994 | Neufeld | 395/575 |
| 5,351,246 | 9/1994 | Blaum et al. | 371/10.1 |
| 5,357,509 | 10/1994 | Ohizumi | 371/10.1 |
| 5,379,417 | 1/1995 | Lui et al. | 395/575 |
| 5,390,187 | 2/1995 | Stallmo | 371/10.1 |
| 5,390,327 | 2/1995 | Lubbers et al. | 395/575 |
| 5,392,244 | 2/1995 | Jacobson et al. | 365/200 |
| 5,414,455 | 5/1995 | Hooper et al. | 348/7 |
| 5,422,674 | 6/1995 | Hooper et al. | 348/409 |
| 5,442,390 | 8/1995 | Hooper et al. | 348/7 |
| 5,528,765 | 6/1996 | Milligan | 395/287 |
| 5,553,073 | 9/1996 | Barraclough et al. | 370/85.5 |
| 5,559,797 | 9/1996 | Murase | 370/61 |
| 5,564,025 | 10/1996 | De Freese et al. | 395/290 |
| 5,581,703 | 12/1996 | Baugher et al. | 395/200.06 |
| 5,603,058 | 2/1997 | Belknap et al. | 395/855 |
| 5,613,071 | 3/1997 | Rankin et al. | 395/200.16 |
| 5,630,067 | 5/1997 | Kindell et al. | 395/200.09 |
| 5,706,048 | 1/1998 | Davis | 348/12 |
| 5,713,017 | 1/1998 | Lin et al. | 395/608 |
| 5,787,264 | 7/1998 | Christiansen et al. | 395/293 |
| 5,802,366 | 9/1998 | Row et al. | 395/683 |

OTHER PUBLICATIONS

Research Issues in Data Engineering 1992 Workshop, Golubchik et al., Chained Declustering: Load Balancing and Robustness to Skew and Failures,: at 88.

1994 Paralel Processing Symposium, Buck, "The Oracle Media Server for nCUBE Massively Parallel Systems," at 670.

1994 High Performance Distributed Computing International Symposium, Catania et al., "Performance Evaluation of a Partial Dynamic Declustering Disk Array System," at 244.

InfoWorld, Feb. 21, 1994, Mace, "Oracle Media Server Widely Endorsed," at 20.

1194 Parallel and Distributed Processing Symposium, Li et al., "Combining Replication and Parity Approaches for Fault–Tolerant Disk Arrays," at 360.

SYSTEM FOR GRANTING BANDWIDTH FOR REAL TIME PROCESSES AND ASSIGNING BANDWIDTH FOR NON-REAL TIME PROCESSES WHILE BEING FORCED TO PERIODICALLY RE-ARBITRATE FOR NEW ASSIGNED BANDWIDTH

BACKGROUND OF THE INVENTION

1. Field of the Invention

The present invention relates to the field of real time computer systems, and to a method and apparatus for coordinating access to a storage system by a mix of real time and non-real time processes of the real time computer system.

2. Background Art

Real time operating systems are well known in the prior art. These operating systems are typically multi-tasking preemptive operating systems providing low level support for system or client real time processes. Real time processes are those requiring some minimal level of processing time or input/output (I/O) data transfers over a given time slice. Real time processes often require a particular minimal bit rate delivery of data or I/O bandwidth of the available processing or input/output (I/O) capacity. Non-real time processes are those not requiring a minimal bit rate or I/O bandwidth. Non-real time processes typically do not suffer performance failures if their processing is interrupted for a period of time. Real time processes are sensitive to such system interruptions.

An example of a system in which interruptions in the delivery of data produce unacceptable results is a video file system in a video server used for on-demand delivery of full length video programs. In such a system, hundreds of full length videos are stored in digital form in a multi-terabyte data storage system. Video data is retrieved in real time at a customer's request, and delivered via a communications network to the customer for viewing. In this type of system, interruptions in the continuous flow of video data from the real time system to the customer or client cause "blips" or other unacceptable deterioration in the quality of the video image being delivered. To deliver a satisfactory product to the end-user, such interruptions must be avoided.

Real time processes, such as a video server, require a certain amount of I/O subsystem resources (e.g. disk bandwidth). There are two ways used in the prior art for handling these real time processes.

The first prior art method for supporting real time processes is the use of an operating system that supports scheduling priorities. In this prior art implementation, a real time process running on top of an operating system that supports scheduling priorities gives itself a scheduling priority. The operating system uses the scheduling priority when scheduling central processing unit (CPU) time and when issuing I/O requests to an I/O device (e.g. a mass storage device or storage subsystem such as a disk drive or array of disk drives) for the real time process. This prior art implementation allows real time and non-real time processes to co-exist; however, such operating systems cannot always guarantee that the minimum I/O requirements of the real time process are met. In particular, the CPU scheduler may not be perfectly tuned to the needs of a particular real time process. Further, such operating systems are not always available.

The second prior art method for supporting real time processes is the use of a single I/O process for centralizing the scheduling of I/O requests to an I/O device or subsystem. Referring to FIG. 6, a server 120 is shown to contain a single centralized I/O process 128 for scheduling and handling real time I/O requests to an I/O device 130 from a plurality of client systems or processes 126. The centralized I/O process 128 is able to coordinate all accesses to the I/O device 130 and all accesses to the I/O device 130 are made through the centralized process 128. This approach allows the centralized I/O process 128 to tightly control the scheduling of accesses to the I/O device 130 by assigning a time slice to each client 126. The problem with this approach is that both real time and non-real time processes cannot be accommodated efficiently. Also, a central scheduling implementation does not scale well. As the number of processes increases, the amount of overhead performed by the scheduling mechanism rapidly increases. Hence, the scheduler quickly becomes a system bottleneck.

It would be advantageous to implement a system in which a real-time process could control the bit rate of the delivery of a stream of real time data. It would also be advantageous to allow both real time and non-real time processes to be serviced according to their respective processing needs. It would be further advantageous to provide such a system that was independent of a particular operating system or system hardware platform. These characteristics are not present in prior art computer systems.

U.S. Pat. No. 5,278,838 issued to Ng et al. discloses a method for rebuilding lost data in a redundant array data storage system (RAID) system while reducing interference with normal data recovery and storage operations.

U.S. Pat. No. 5,315,602 issued to Noya et al. discloses a system for reducing the number of I/O requests required to write data in a RAID system.

U.S. Pat. No. 5,305,326 issued to Solomon et al. discloses a method for handling reconstruction of data after a power failure, for example after a power failure of an I/O processor in a RAID system.

U.S. Pat. No. 5,303,244 issued to Watson discloses a method for mapping logical RAID storage arrays to physical disk drives.

U.S. Pat. No. 5,235,601 issued to Stallmo et al. discloses a method for restoring valid data in a RAID system after a write failure caused by a storage unit fault.

U.S. Pat. No. 5,233,618 issued to Glider et al. discloses a method and apparatus for detecting and reconstructing incorrectly routed data, for detecting when a failure in writing a block of data has occurred, and for reconstructing the lost data.

U.S. Pat. No. 5,287,462 issued to Jibbe et al. discloses an apparatus for coupling a host bus with a number of storage array busses in a RAID system.

U.S. Pat. No. 5,124,987 issued to Milligan et al. discloses a disk drive array in which updates of redundancy data are eliminated by writing modified "virtual track instances" into logical tracks of the disks comprising a redundancy group.

U.S. Pat. No. 5,088,081 issued to Farr discloses a RAID system in which reconstructed data from a bad data block are stored on a "reserve disk."

U.S. Pat. No. 4,761,785 issued to Clark et al. discloses a storage management system in which parity blocks are distributed among a set of storage devices instead of being stored in a single storage device.

Co-pending U.S. patent application Ser. No. 08/312,509 filed Sep. 26, 1994 now U.S. Pat. No. 5,623,595 discloses a method and apparatus for providing transparent, real-time reconstruction of corrupted data from a redundant array of storage units.

Thus, a better mechanism for coordinating access to a storage system in a real time environment is needed.

SUMMARY OF THE INVENTION

The present invention comprises a method and apparatus for coordinating access to a storage system in a real time processing system. In an apparatus including a file server and a storage system, an apparatus and method is disclosed for coordinating access to the storage system. The method includes the steps of: 1) computing an available data rate for the storage system, 2) receiving a first access request from a real time process, the first access request including a request for a requested data rate, 3) granting the first access request if the requested data rate is less than or equal to the available data rate, and 4) allowing the real time process to directly access the storage system at the requested data rate. The method of the present invention includes the step of deriving an updated available data rate based upon the available data rate and the requested data rate. In addition, the method of the present invention includes the steps of: 1) receiving a second access request from a non-real time process, 2) assigning an assigned data rate to the non-real-time process, the assigned data rate being at least a portion of the updated available data rate, and 3) allowing the non-real time process to directly access the storage system at the assigned data rate.

The present invention is particularly suited to applications in which data is retrieved from a storage system using data striping for better load balancing; however, the benefits of the present invention are realized even if such a storage system is not used. The system of the present invention thus delivers data at a consistent rate regardless of whether real time or non-real time processes are executing.

It is an advantage of the present invention that a real time process can control the bit rate of the delivery of a stream of real time data. It is a further advantage of the present invention that both real time and non-real time processes can be serviced according to their respective processing needs. It is a further advantage of the present invention that such a system is independent of a particular operating system or system hardware platform. These and other advantages of the present invention are described in detail in the following detailed description of the preferred embodiment of the present invention.

BRIEF DESCRIPTION OF THE DRAWINGS

The features and advantages of the present invention will be apparent from the accompanying drawings and from the detailed description of the preferred embodiment of the present invention as set forth below.

DETAILED DESCRIPTION OF THE INVENTION

The present invention comprises a method and apparatus for coordinating access to a storage system in a real time processing system. In the following detailed description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 1:
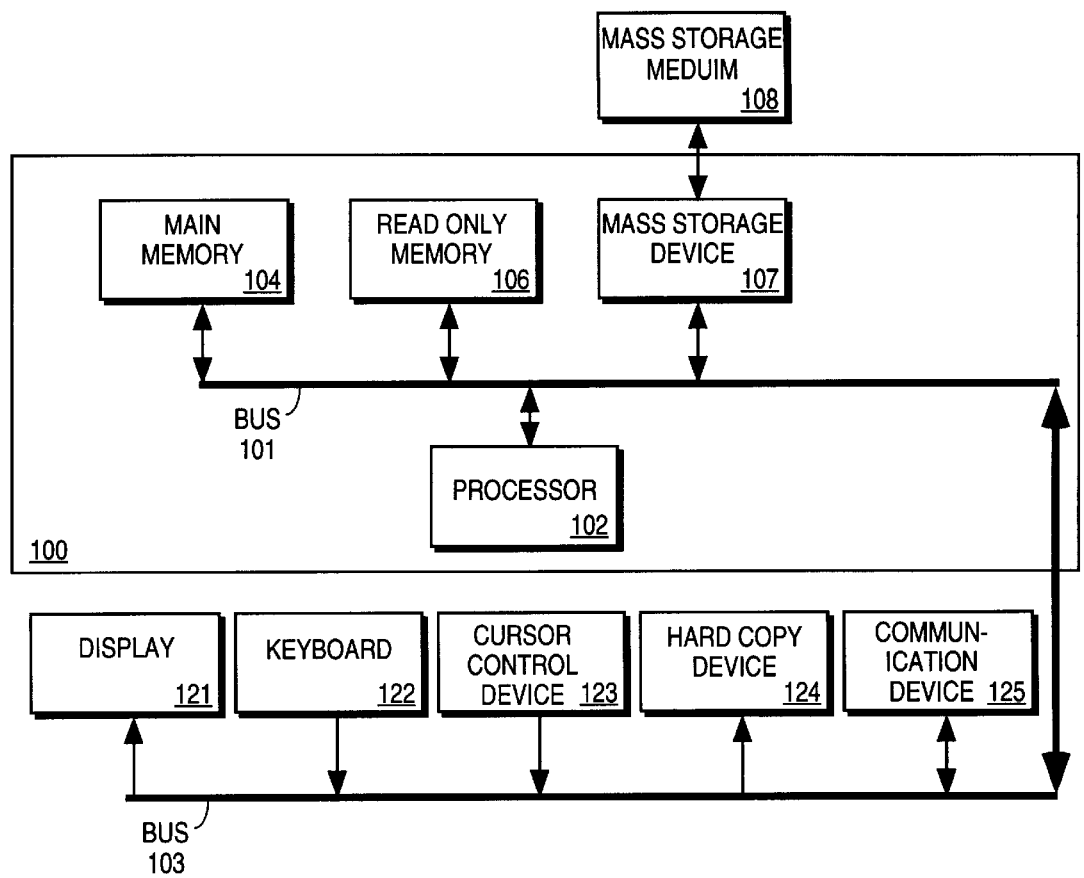
FIG. 1 illustrates a typical computer platform on which the present invention may be implemented.

FIG. 1 illustrates a typical data processing system upon which one embodiment of the present invention is implemented. It will be apparent to those of ordinary skill in the art, however that other alternative systems of various system architectures may also be used. The data processing system illustrated in FIG. 1 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. In the preferred embodiment, a communication device 125 is coupled to bus 101 through bus 103 for use in accessing other nodes of a distributed system via a network. This communication device 125 may include any of a number of commercially available networking peripheral devices such as those used for coupling to an Ethernet, token ring, Internet, or wide area network. Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer or a Sun® SPARC Workstation. Processor 102 may be one of the 80X86 compatible microprocessors such as the 80486 or PENTIUM® brand microprocessors manufactured by INTEL® Corporation of Santa Clara, Calif.

The software implementing the present invention can be stored in main memory 104, mass storage device 107, or other storage medium locally accessible to processor 102. Other storage media may include floppy disk drives, memory cards, flash memory, or CD-ROM drives. It will be apparent to those of ordinary skill in the art that the methods and processes described herein can be implemented as software stored in main memory 104 or read only memory 106 and executed by processor 102. This software may also be resident on an article of manufacture comprising a computer readable medium 108 having computer readable program code embodied therein and being readable by the mass storage device 107 and for causing the processor 102 to coordinate accesses to a storage system in accordance with the teachings herein.

Dynamic I/O Bandwidth Allocation

Figure 2:
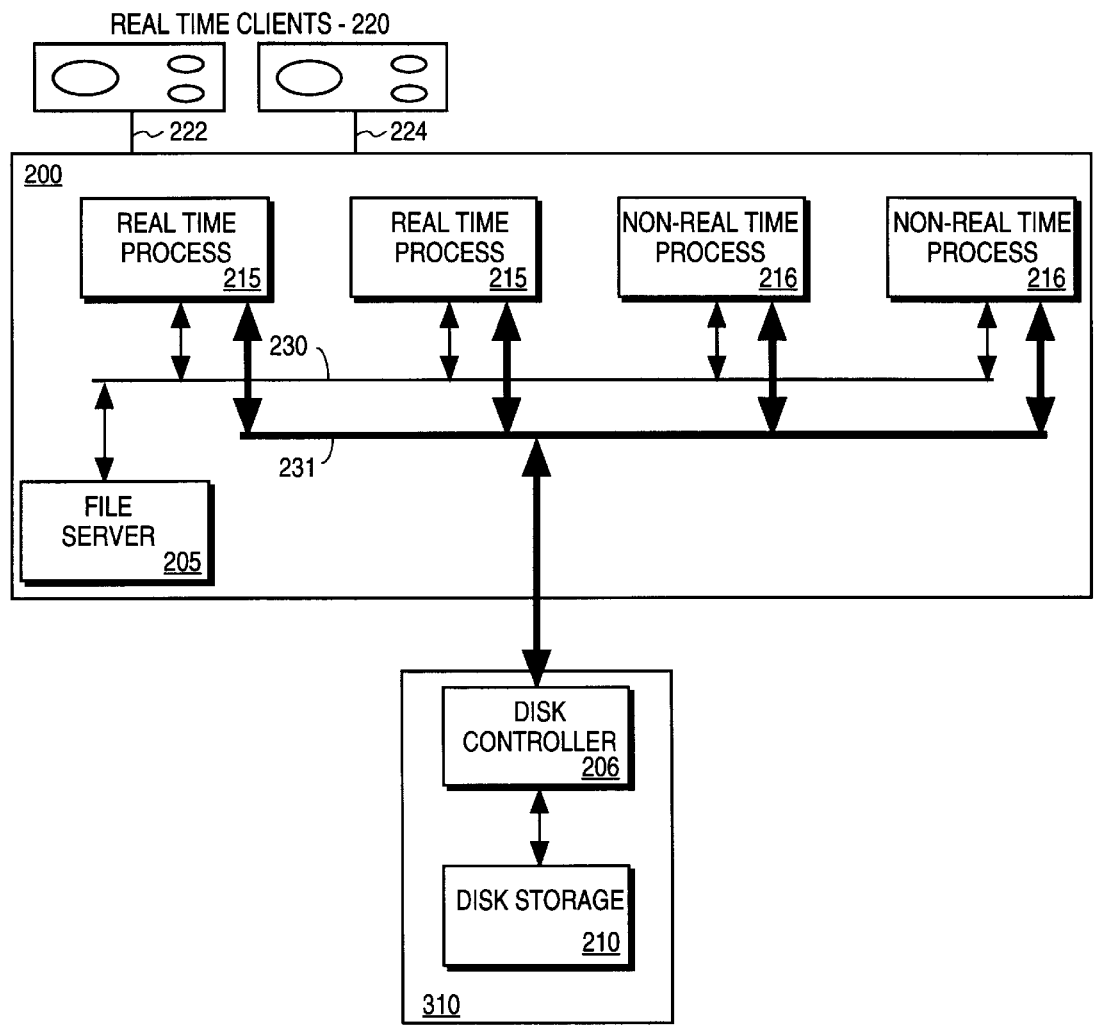
FIG. 2 illustrates a typical data processing system in which the present invention is implemented.

Referring to FIG. 2, the server 200 of the preferred embodiment can accommodate a plurality of real time processes 215, and non-real time processes 216 executing therein. Server 200 is shown coupled to a disk subsystem 310 comprised of a disk controller 206 and disk storage 210. Server 200 is also coupled to a plurality of real time clients 220. In this typical configuration of processes, real time processes 215 require a steady stream of real time data at a fixed data rate across communication lines 222 and 224 to feed their real time clients 220. Conversely, non-real time processes 216 do not have such a data rate requirement. Such non-real time processes include copy operations, loading operations, or back-up processes.

The real time processes 215 correspond to the real time clients 220. Server 200 also includes a file server 205, which is used by the plurality of processes 215 and 216 for processing I/O bit rate requests from the plurality of real time processes 215 and to assign an I/O bit rate for each of the plurality of processes 215 and 216. These I/O bit rate requests and corresponding I/O bit rate assignments are performed between file server 205 and the plurality of processes 215 and 216 on data path 230 as shown in FIG. 2. The major function of file server 205 is to coordinate access to the disk subsystem 310 by the processes 215 and 216.

Once a process 215 or 216 obtains an I/O bit rate assignment from the file server 205, the process 215 or 216 directly accesses the disk controller 206 on data path 231. Note that this access is direct to the storage subsystem 310 and bypasses the file server 205. It is possible that collisions may occur when multiple processes 215 or 216 try to access the storage subsystem 310 at the same time. However statistically, this type of collision does not occur frequently. The file server 205 allocates, if possible, the data rate requirements of the real time processes 215 and allocates reasonable I/O bit rates to the non-real time processes 216 given the I/O bandwidth limitations of the storage subsystem 310. It is the functionality of the present invention that makes this difficult task possible.

Figure 3:
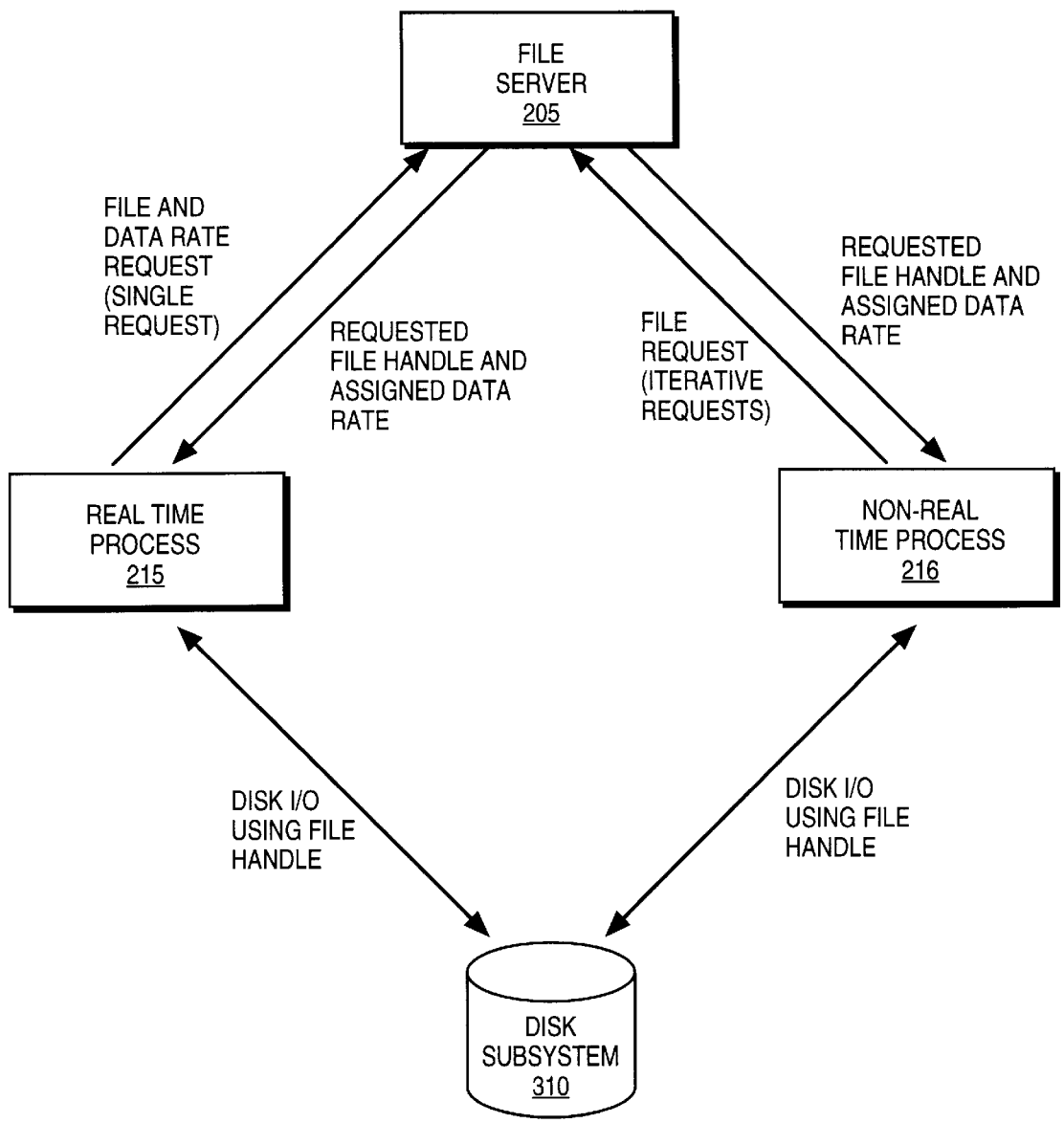
FIG. 3 illustrates a schematic of the processing flow performed by real time and non-real time clients.

Referring now to FIG. 3, the protocol of the transactions between the file server 205 and real time processes 215 and non-real time processes 216 is illustrated. Both real time processes 215 and non-real time processes 216 compete for usage of the disk subsystem 310. File server 205 manages the I/O bandwidth provided by disk subsystem 310. Every particular computer system configuration has a peak I/O bandwidth which represents the maximum output provided by the storage subsystem. Although a data striped disk subsystem, for example, balances the load across a plurality of disk units, there is still a peak I/O bandwidth that the storage subsystem cannot exceed without causing interruptions in the data provided to the processes 215 and 216.

The peak bandwidth of a particular system is determined by way of conventional testing and stored by file server 205 in a variable identified as BW_Max. This value represents the maximum or optimum I/O data rate at which data can be delivered by the storage subsystem. The optimum I/O data rate will vary depending on how a particular system is configured; however, the optimum I/O data rate for a particular system can be pre-determined or easily computed. A variable identified as BW_Available is initialized with the BW_Max optimum I/O data rate value. The BW_Available value represents the currently available (i.e. unallocated) I/O bandwidth for the storage subsystem. This value will change as processes begin to use the storage subsystem.

In FIG. 3, a file and data rate request is received by file server 205 from real time process 215. This request includes a requested I/O data rate or I/O bit rate at which the real time process 215 would like to receive the data from the requested file. This client requested data rate is identified as BW_Req. The file server 205 computes the difference between the client requested data rate (BW_Req) and the available data rate (BW_Available). The BW_Req value is subtracted from the BW_Available value. If the result is positive, the client request is satisfied and the handle to the requested file is delivered to the real time process 215 along with the assigned I/O data rate. In this case, the assigned I/O data rate is the same as the requested data rate. The result is stored back in the BW_Available variable as an updated available data rate (BW_Available=BW_Available−BW_Req). If the result is negative, the client request cannot be granted. In this case, the client request is denied. In an alternative embodiment, the process 215 can be offered a reduced I/O data rate or assigned an I/O data rate which is smaller than the rate requested. If the process 215 accepts the reduced rate, the client request succeeds and the assigned I/O data rate, at the reduced rate, is granted to the client. The BW_Available value is updated to account for the bandwidth consumed at the reduced rate (BW_Available=BW_Available−reduced rate). The file handle of the requested file is delivered to the process 215. Once the real time process 215 has obtained a file handle and assigned I/O data rate from the file server 205, the real time process 215 directly accesses the disk subsystem 310 using the file handle obtained from the file server 205.

Referring still to FIG. 3, the protocol between the non-real time processes 216 and file server 205 is illustrated. The transaction between the nonreal time processes and the file server 205 does not need to specify a particular data rate as is the case with a real time process 215. Instead, the non-real time process 216 merely requests a particular identified file from file server 205. The file server 205 returns a handle to the requested file, if possible, and assigns the non-real time process 216 a computed (i.e. assigned) data rate (BW_Assigned), which represents a portion of the available data rate (BW_Available). This assigned data rate can be computed in a number of ways. In the preferred embodiment, the non-real time process 216 is given an assigned data rate that represents some percentage (e.g. 10%) of the available I/O bandwidth, BW_Available (for example, BW_Assigned=BW_Available*0.10). It is important to prevent a non-real time process 216 from consuming all of the available I/O bandwidth thereby causing a subsequent request from a real time process 215 to fail. Depending upon a particular system configuration and usage, the assigned data rate for a non-real time process 216 can be some other percentage or portion of the available I/O bandwidth. Alternatively, the assigned data rate for a non-real time process 216 can be some fixed value less than the available I/O bandwidth or some fixed offset from the available I/O bandwidth. It will be apparent to those of ordinary skill in the art that other equivalent computations of the assigned I/O data rate for non-real time processes 216 can be implemented. Once the non-real time process 216 has obtained a file handle and assigned I/O data rate from the file server 205, the non-real time process 216 directly accesses the disk subsystem 310 at the assigned I/O data rate using the file handle obtained from the file server 205. Also, the BW_Available value is updated to account for the bandwidth consumed at the assigned rate (BW_Available=BW_Available−BW_Assigned).

In order to prevent the non-real time process 216 from dominating the available I/O bandwidth, the file server 205 forces the non-real time process 216 to re-arbitrate the assigned I/O data rate after the non-real time process 216 has had access to the requested file at the assigned I/O data rate for some pre-defined time period (i.e. time slice). When this time slice has expired, the non-real time process 216 must again request the file server 205 for access to the desired file and again be assigned an I/O data rate by the file server 205. Because other clients may have requested access to the disk subsystem 310 or terminated their access to the disk subsystem 310 while the non-real time process 216 has been consuming bandwidth during its time slice, the newly assigned data rate for the non-real time process 216 may not be the same as the data rate assigned in the previous time slice. Thus, the I/O bandwidth used by non-real time processes 216 is dynamically re-adjusted as the non-real time processes 216 iteratively re-request the desired file from file server 205. The BW_Available value is correspondingly updated to account for the newly assigned data rate by adding the previously assigned date rate back into the available bandwidth value and then reducing the available bandwidth by the newly assigned data rate (BW_Available=BW_Available+BW_Assigned (previous); BW_Available=BW_Available−BW_Assigned(new)).

Figure 4:
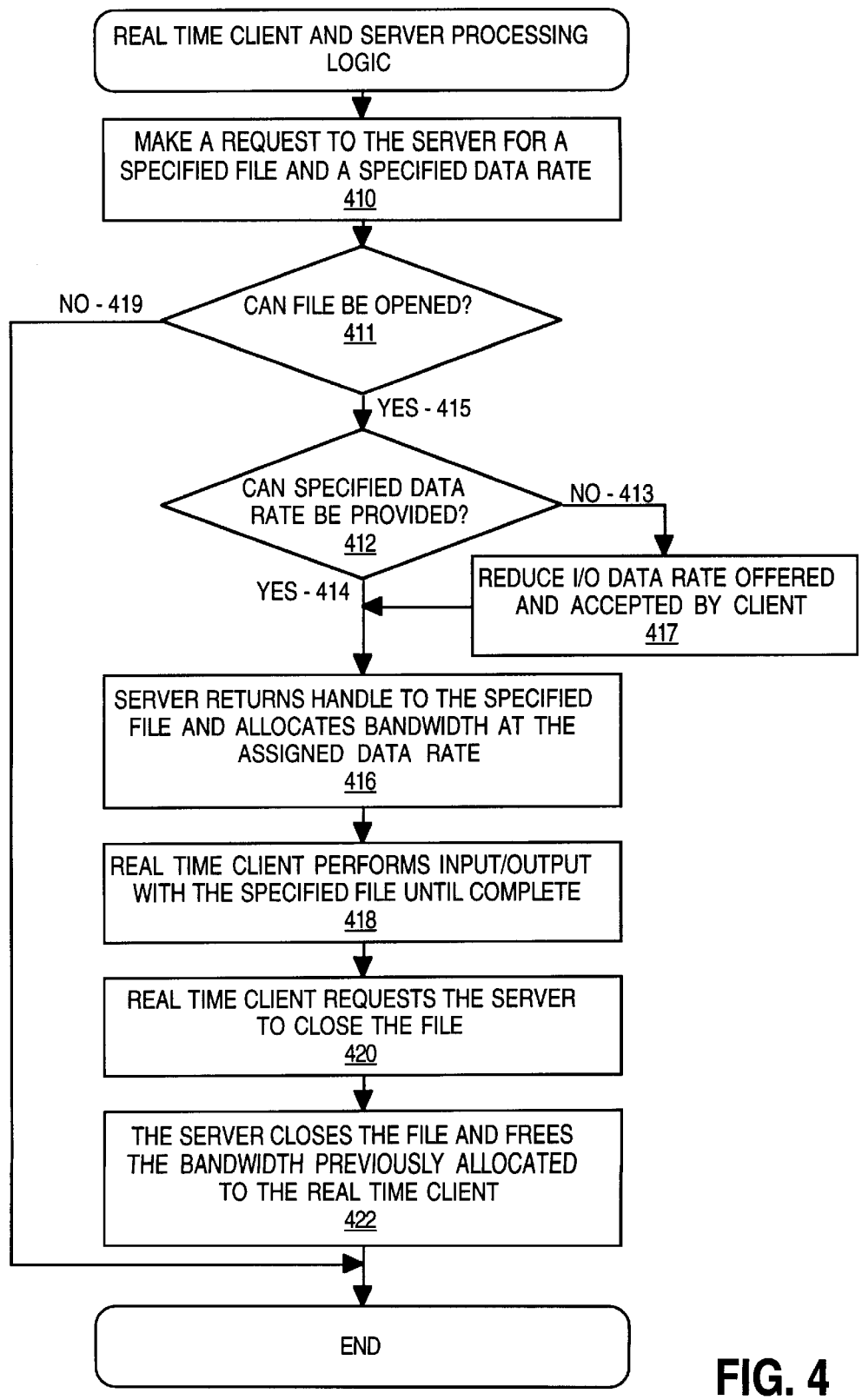
FIGS. 4 and 5 are flowcharts of the dynamic bandwidth allocation process of the preferred embodiment.

Referring now to FIG. 4, the processing logic used by the file server 205 and a real time process 215 is illustrated. In block 410, a real time process 215 makes a request to the file server 205 for a specified file and a requested I/O data rate. If the requested file cannot be opened (processing path 419), processing is terminated through the End block shown in FIG. 4. In this case, the requested file is currently unavailable to the requesting client. If the file server 205 can provide the requested file, processing path 415 is taken and block 412 is executed. If the requested I/O data rate, BW_Req, is larger than the available bandwidth, BW_Available, the requested I/O data rate cannot be provided (processing path 413). In this case, either processing is terminated at the End block or, in an alternative embodiment, a reduced I/O data rate is offered to the process 215 (processing block 417). If the reduced I/O data rate is accepted by the process 215 or if the server can provide the requested I/O data rate (BW_Req is smaller than or equal to the available bandwidth, BW_Available), processing block 416 is executed. The file server 205 returns a file handle to the process 215 and returns the assigned data rate (i.e. the requested rate or the reduced rate) to the process 215 (block 416). The BW_Available value is updated to account for the bandwidth consumed at the assigned rate (BW_Available=BW_Available−BW_Assigned). The real time process 215 uses the file handle to directly access the storage subsystem 310 to perform input/output with the specified file at the assigned I/O data rate until the process is finished with the file (block 418). When finished, the real time process 215 closes the file (block 420). The file server 205 releases the previously assigned I/O bandwidth (block 422). Bandwidth is released by adding the previously assigned and now relinquished I/O bandwidth back into the available bandwidth (BW_Available=BW_Available+BW_Assigned). Processing for the real time process 215 terminates through the End block shown in FIG. 4.

It is important to note that the present invention assigns I/O data rates for each process, not time slices for each process as in the prior art systems. This is important because this distinction allows the present invention to effectively accommodate real time processes and non-real time processes in their access to a storage subsystem, wherein each process whether real time or non-real time can receive its own assigned I/O data rate. This feature allows the present invention to fully utilize the I/O bandwidth available in a particular storage subsystem. The present invention is advantageous also because it eliminates the need to precisely schedule all accesses. In this implementation, much less coordination and synchronization is needed.

Figure 5:
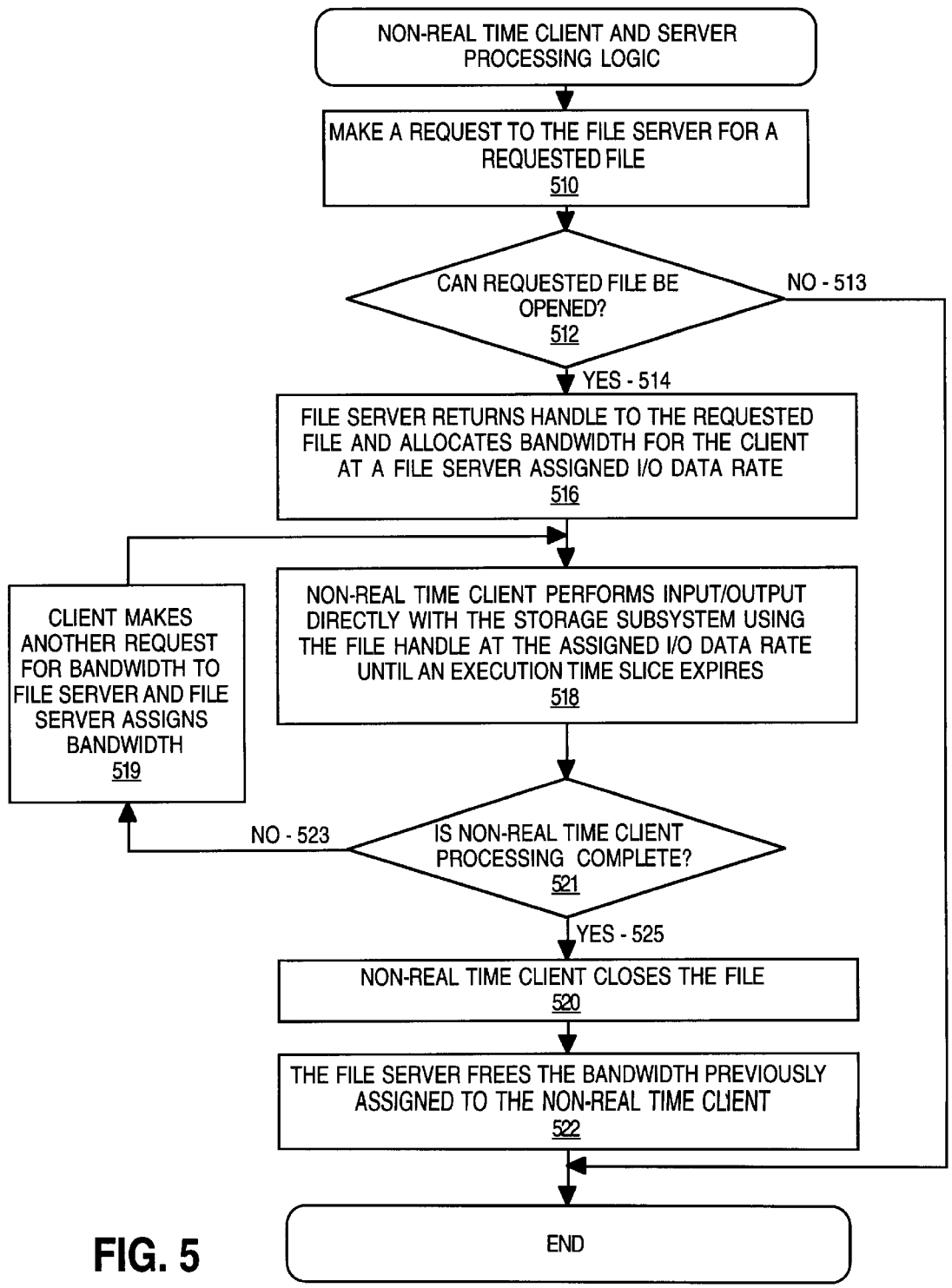
Figure 6:
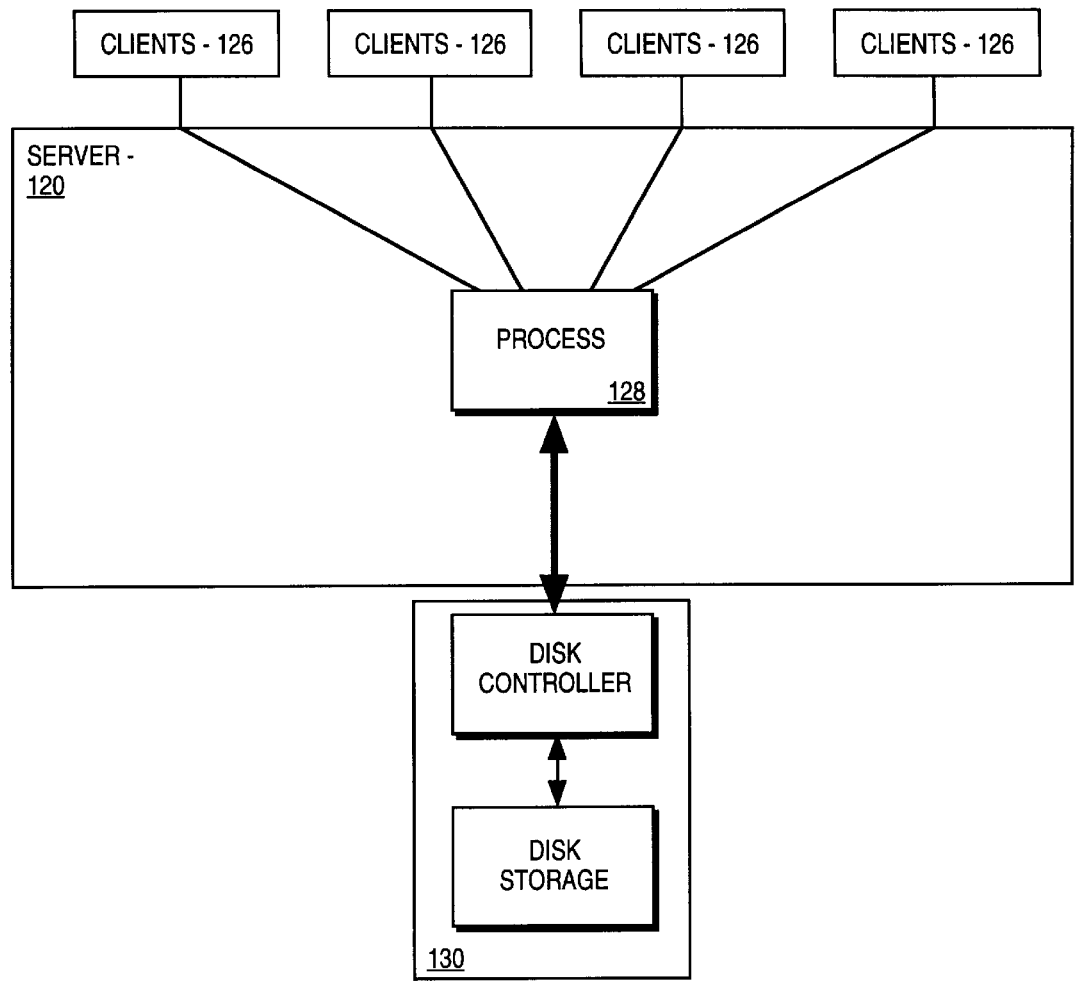
FIG. 6 illustrates a typical prior art implementation.

Referring now to FIG. 5, the processing logic used by the file server 205 and a non-real time process 216 is illustrated. In block 510, a non-real time process 216 makes a request to the file server 205 for a requested file. If the requested file cannot be opened (processing path 513), processing is terminated through the End block shown in FIG. 5. In this case, the requested file is currently unavailable to the requesting client. If the file server 205 can provide the requested file, processing path 514 is taken and block 516 is executed. The file server 205 returns a file handle of the requested file and dynamically assigns an assigned I/O data rate to the non-real time process 216 (block 516) as described above. The BW_Available value is updated to account for the bandwidth consumed at the assigned rate (BW_Available=BW_Available−BW_Assigned). The non-real time process 216 performs input/output directly with the storage subsystem 310 using the file handle at the assigned I/O data rate until an execution time slice expires (block 518). If the non-real time process 216 has not completed its I/O with the requested file (path 523), the non-real time process 216 again issues a request to the file server 205 for access to the file and the file server 205 assigns a new I/O data rate to the non-real time process (block 519) for the next time slice. The BW_Available value is correspondingly updated to account for the new assigned data rate by adding the previous assigned date rate back into the available bandwidth value and then reducing the available bandwidth by the newly assigned data rate (BW_Available=BW_Available+BW_Assigned (previous); BW_Available=BW_Available−BW_Assigned(new)). Block 518 is executed for the next time slice at the newly assigned data rate. Processing continues in this loop with dynamically assigned I/O data rates until the non-real time process 216 file input/output has been completed. When finished (path 525), the non-real time process 216 closes the file (block 520). The file server 205 releases the previously allocated bandwidth (block 522). Bandwidth is released by adding the previously assigned and now relinquished bandwidth back into the available bandwidth (BW_Available=BW_Available+BW_Assigned). Processing for the non-real time process 216 then terminates through the End block as shown in FIG. 5.

In the preferred embodiment of the present invention, a disk array configuration with data striping is used to facilitate a dynamic I/O bandwidth allocation protocol. Data striping ensures that an equal load is applied across all disks. Using this protocol as described herein, a real time process can issue requests to the disk array subsystem at a pre-allocated bit rate and be guaranteed that bit rate. This capability is especially useful for real time applications where a relatively constant bit rate is needed, such as video or audio data applications. Because a data striped disk subsystem supports a high degree of predictability in the rate at which data can be returned, the dynamic I/O bandwidth allocation of a specified or enforced data rate is more easily implemented. It will be apparent to those of ordinary skill in the art, however, that the present invention can also be used in system configurations not having a multiple disk array.

Typical data striping embodiments use a redundant disk array subsystem or RAID system. One such RAID system is disclosed in the above referenced co-pending patent application assigned to the same assignee as the present invention. Other prior art RAID systems are cited above. Because a RAID system guarantees load balancing across all disks of the disk array, a real time RAID system guarantees a predictable performance level.

Thus, a method and apparatus for coordinating access to a storage system by a mix of real time and non-real time processes of the real time computer system is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method for coordinating access to storage system, comprising the steps of:

granting a first access request having a requested data rate if said requested data rate is less than an available data rate;

assigning an assigned data rate in response to a second access request not having a requested data rate, said assigned data rate being a portion of said available data rate, said second access request being allowed to directly access said storage system at said assigned data rate during a certain time period;

forcing said second request to periodically re-arbitrate for a new assigned data rate after said certain time period expires, said new assigned data rate being a portion of said available data rate, said re-arbitration being performed until said second request is competed; and updating said available data rate every time said first access request or said second access request is either granted or terminated.

2. The method as claimed in claim 1 wherein said first access request is made non-iteratively.

3. The method as claimed in claim 1 further including a step of returning a file handle in response to said first access request.

4. The method as claimed in claim 1 further including a step of returning a file handle in response to said second access request.

5. The method as claimed in claim 1 further including the step of:

allowing direct access to said storage system at said requested data rate in response to said first access request.

6. An apparatus for coordinating access to a storage system comprising:

a file server configured to grant a first access request having a requested data rate if said requested data rate is less than an available data rate, said file server configured to assign an assigned data rate in response to a second access request not having a requested data rate, said assigned data rate being a portion of said available data rate, said file server configured to allow said second access request to directly access said storage system at said assigned data rate during a certain time period, said file server further configured to force said second access request to periodically re-arbitrate for a new assigned data rate after said certain time period expires, said new assigned data rate being a portion of said available data rate, said file server configured to perform re-arbitration until said second request is completed and said file server updating said available data rate every time said first access request or said second access request is either granted or terminated.

7. The apparatus as claimed in claim 6 wherein said first access request only once is made non-iteratively.

8. The apparatus as claimed in claim 6 wherein said file server returns a file handle in response to said first access request.

9. The apparatus as claimed in claim 6 wherein said file server returns a file handle in response to said second access request.

10. The apparatus as claimed in claim 6 wherein said file server allows direct access to said storage system at said requested data rate in response to said first access request.

11. An article of manufacture for coordinating access to a storage system, said article of manufacture comprising a computer readable medium having computer readable program code embodied therein for causing a processor to perform the steps of:

granting a first access request having a requested data rate if said requested data rate is less than an available data rate;

assigning an assigned data rate in response to a second access request not having a requested data rate, said assigned data rate being a portion of said available data rate, said second access request being allowed to directly access said storage system at said assigned data rate during a certain time period;

forcing said second request to periodically re-arbitrate for a new assigned data rate after said certain time period expires, said new assigned data rate being a portion of said available data rate, said re-arbitration being performed until said second request is competed; and updating said available data rate every time said first access request or said second access request is either granted or terminated.

12. The article of manufacture as claimed in claim 11 wherein said first access request is made non-iteratively.

13. The article of manufacture as claimed in claim 11 wherein said computer readable medium further includes computer readable program code embodied therein for causing said processor to perform the step of returning a file handle in response to said first access request.

14. The article of manufacture as claimed in claim 11 wherein said computer readable medium further includes computer readable program code embodied therein for causing said processor to perform the step of returning a file handle in response to said second access request.

15. The article of manufacture as claimed in claim 11 wherein said computer readable medium further includes computer readable program code embodied therein for causing said processor to allow direct access to said storage system at said requested data rate in response to said first access request.

16. An apparatus for coordinating access to a storage system, said apparatus comprising:

means for granting a first access request having a requested data rate if said requested data rate is less than an available data rate;

means for assigning an assigned data rate in response to a second access request not having a requested data rate, said assigned data rate being a portion of said available data rate, said second access request being allowed to directly access said storage system at said assigned data rate during a certain time period;

means for forcing said second request to periodically re-arbitrate for a new assigned data rate after said certain time period expires, said new assigned data rate being a portion of said available data rate, said re-arbitration being performed until said second request is competed; and means for updating said available data rate every time said first access request or said second access request is either granted or terminated.

17. The apparatus as claimed in claim 16 wherein said first access request is made non-iteratively.

18. The apparatus as claimed in claim 16 further including means for returning a file handle in response to said first access request.

19. The apparatus as claimed in claim 16 further including means for returning a file handle in response to said second access request.

20. The apparatus as claimed in claim 16 further including means for allowing direct access to said storage system at said requested data rate in response to said first access request.

21. A method for coordinating access to storage system, comprising the steps of:

computing an available data rate;

assigning an assigned data rate in response to a second access request not having a requested data rate, said assigned data rate being a portion of said available data rate, said second access request being allowed to directly access said storage system at said assigned data rate during a certain time period;

forcing said second request to periodically re-arbitrate for a new assigned data rate after said certain time period expires, said new assigned data rate being a portion of said available data rate, said re-arbitration being performed until said second request is competed; and updating said available data rate every time said second access request is either granted or terminated.

* * * * *